J. W. L. KERR & C. V. NEESON.
MOLD FOR HOLLOW ARTICLES.
APPLICATION FILED MAR. 8, 1912.

1,075,290.

Patented Oct. 7, 1913.

2 SHEETS—SHEET 1.

WITNESSES
F. E. Gaither
Thomas B. Joyce

INVENTORS
James W. L. Kerr
Charles V. Neeson
by Darwin S. Wolcott
atty.

COLUMBIA PLANOGRAPH CO., WASHINGTON, D. C.

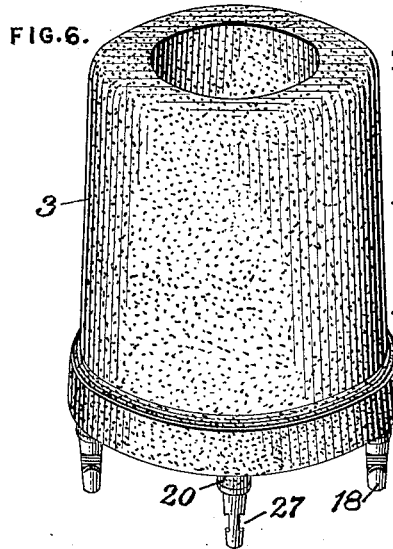
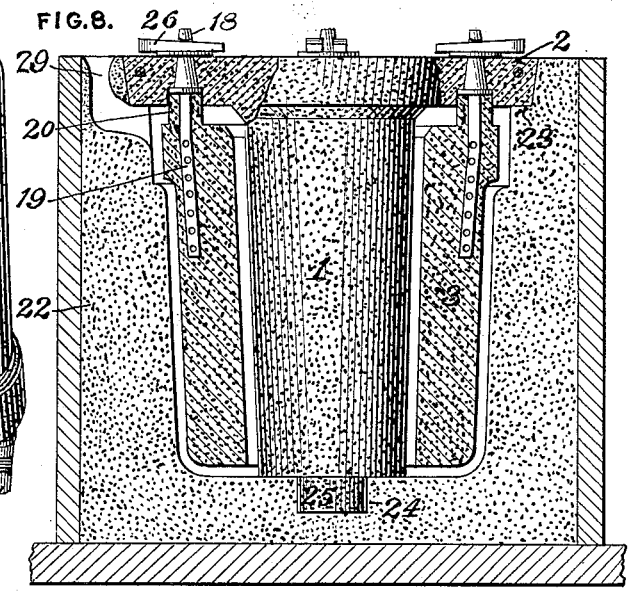
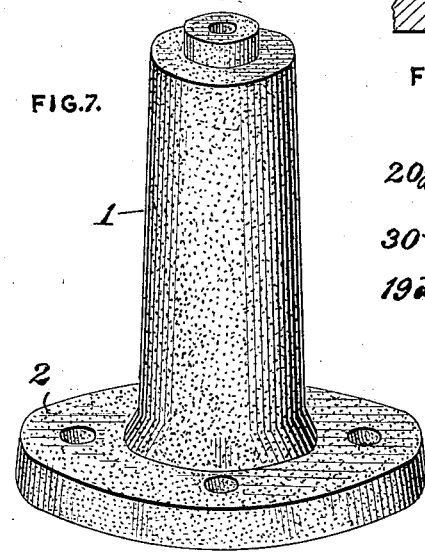
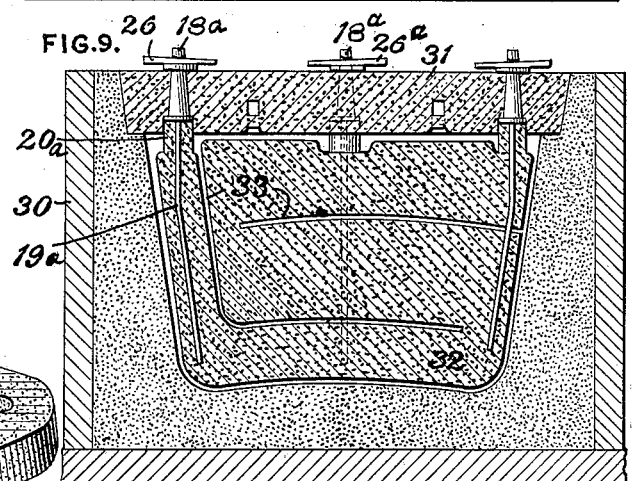
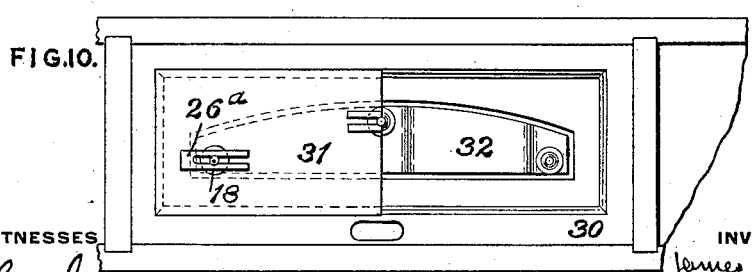

UNITED STATES PATENT OFFICE.

JAMES W. L. KERR, OF WEST VIEW, AND CHARLES V. NEESON, OF PITTSBURGH, PENNSYLVANIA, ASSIGNORS TO LAWRENCEVILLE BRONZE CO., OF PITTSBURGH, PENNSYLVANIA, A CORPORATION OF PENNSYLVANIA.

MOLD FOR HOLLOW ARTICLES.

1,075,290.  Specification of Letters Patent.  Patented Oct. 7, 1913.

Application filed March 8, 1912. Serial No. 682,384.

*To all whom it may concern:*

Be it known that we, JAMES W. L. KERR, residing at West View, in the county of Allegheny and State of Pennsylvania, and CHARLES V. NEESON, residing at Pittsburgh, in the county of Allegheny and State of Pennsylvania, citizens of the United States, have invented or discovered certain new and useful Improvements in Molds for Hollow Articles, of which improvements the following is a specification.

The invention described herein relates to certain improvements in molds for twyers, bosh plates, etc., and is hereinafter more fully described and claimed.

Figure 1:
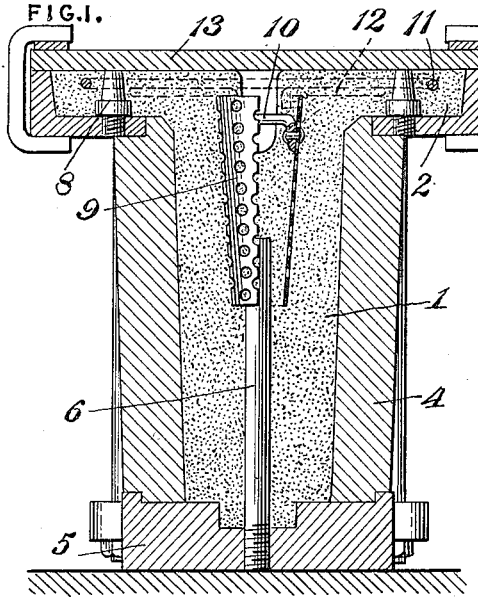
Figure 3:
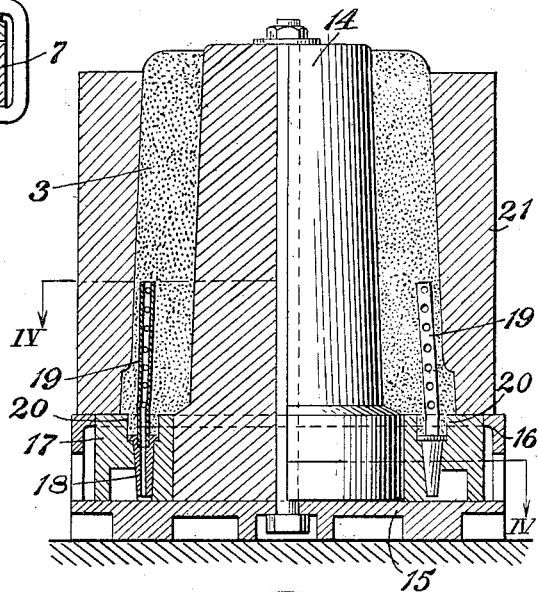
Figure 2:
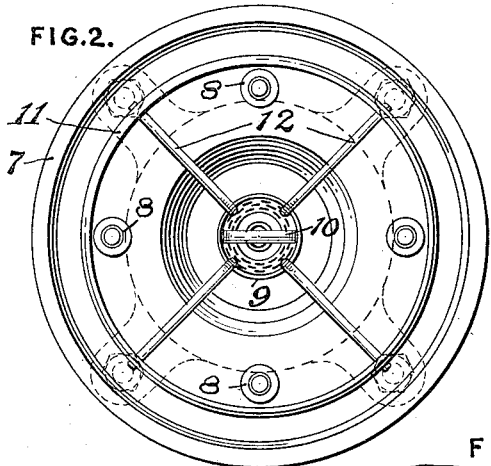
Figure 4:
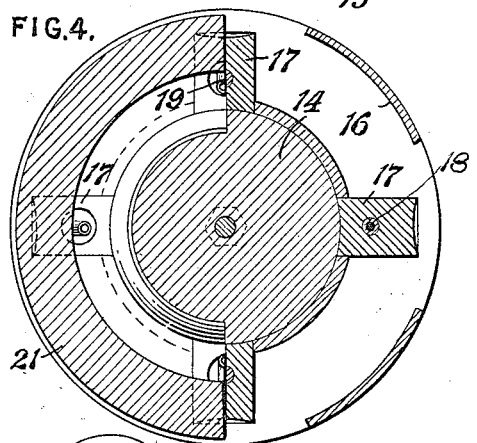
Figure 5:
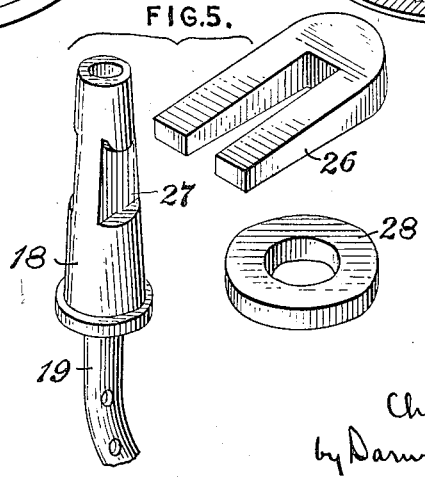

In the accompanying drawings forming a part of this specification Figure 1 is a sectional elevation illustrating the manner of forming the central core for the twyer box; Fig. 2 is a top plan view of the parts shown in Fig. 1 the mold board being removed preparatory to charging the sand; Fig. 3 is a vertical section illustrating the manner of forming the annular core for twyer boxes; Fig. 4 is a sectional plan view the planes of section being indicated by the line IV—IV, Fig. 3; Fig. 5 shows in detail certain parts for supporting and locking the cores; Figs. 6 and 7 are perspective views of the annular and central cores respectively; Fig. 8 is a sectional elevation of a complete mold for a twyer box; Fig. 9 is a sectional elevation of a mold for a bosh plate, and Fig. 10 is a top plan view, a portion of the top part or member being broken away.

In forming molds for twyer boxes, which are provided with an annular chamber for the circulation of a cooling medium, the core 1 for the central opening through twyer box, is formed of a sand mixed with a suitable binder, in order that it may have sufficient strength when baked, to support not only the flange like portion 2, which serves as the cope of the completed mold, but also the annular core 3. In making the core the box 4 is supported on a base 5 to which is secured a rod 6 adapted to form a central venting in the core. A supplemental box 7 is supported by the upper end of the box, and in the supplemental box is formed the cope portion 2. Openings are formed through the portions 2 by means of plugs 8 suitably secured in the supplemental box. The material of the core may be rammed by hand or may be compacted by a jarring machine as is well known in the art. In forming the core it is preferred to incorporate therewith a shell 9 having a transverse bar 10 adapted to serve as a handle in the manipulation of the core as hereinafter described. In order to strengthen the flange portion 2 a ring 11 and a series of rods 12 extending radially from the shell 9 under the ring 11 may be employed as shown in Fig. 1. After the material has been compacted and the top "struck off" as is customary, a portion of the material is removed to afford access to the handle 10. A plate 13 is then clamped to the supplemental box 7, and the parts are inverted and the plate 3 and boxes 4 and 7 stripped off, and the core suitably baked.

In forming the annular core 3 a central pattern 14, having an external diameter greater than the external diameter of the core 1 by an amount dependent on the desired thickness of the inner wall of the twyer box, is placed centrally on the mold board 15, which is formed with an annular shell like portion 16 provided with an inwardly projecting flange or shelf as shown in Figs. 3 and 4. This shelf is notched for the reception of blocks 17 adapted to serve as supports for the hollow anchor studs 18 which are provided with perforated tubular extensions 19 adapted to be embedded in the completed core. The blocks are recessed around the seats for the studs 18 to form prints or circular projections 20 on the ends of the cores. These prints form distance pieces to maintain the annular core 3 and the cope portion 2 in proper spaced relation and also protect the perforated pipes 19 from the molten metal. The core box 21 is supported by the shelf on the shell 16, which together with the blocks 17 close the lower end of the box. The sand mixed with a suitable binder is compacted in the box and around the pattern in any suitable manner known in the art. After the box 21 is removed the other parts are inverted and the board 15 with the pattern are stripped off and the blocks 17 removed, and the core placed in a suitable oven and baked. The drag 22 is formed of green sand in any suitable manner, the pattern being provided with suitable portions to form seat 23 for the cope portion 2 and a seat 24 for the entering projection 25 on the lower end of the core 1.

After the cores 1 and 3 have been suitably baked and coated they are placed together the portion 1 extending through the core 3. The anchor studs 18 project through the openings formed by the plugs 8 in the cope portion 2. These anchor studs may be secured in position by any suitable means as for example by forked wedges 26 which engage notches 27 in the sides of the studs as shown in Figs. 5 and 8. It is preferred that washers 28, should form bearings for the wedges.

In driving the wedges onto the anchors the annular core will be firmly attached to the cope portion 2 the prints 20 entering seats formed in the underside of the cope 2. When the parts 1, 2 and 3 have thus been secured together they are placed in position in the drag the portion 2 entering the seat 24 and closing the upper end of the matrix in the drag. Before placing the cores in position a pouring gate 29 is formed in the drag as shown in Fig. 8.

Figs. 9 and 10 illustrate an adaptation of our improvements for the formation of bosh plates which are hollow box like structures having partitions so arranged as to form tortuous passages for the cooling medium flowing therethrough. The mold for forming these plates, consists of a drag 30 having the matrix formed of green sand, a cope portion 31 formed of material similar to that employed in forming the cores heretofore described. In making the cope openings are formed for the reception of the anchor studs 18$^a$, which are secured to the core 32 in any suitable manner preferably by embedding therein pipes 19$^a$ connected to the anchor studs. The baked sand core 32 has formed therein slots 33 extending through the sides of the core so that the molten metal may enter the slots and form partitions in the completed bosh plate. The core 32 is secured to the cope before said parts are placed in the drag by means of the anchor studs 18$^a$ and wedges 26$^a$ as described or in any other suitable manner.

It is characteristic of our improvement that core or cores as the case may be depend from the cope portion and are detachably secured thereto thus permitting of the independent formation of said parts. It is further characteristic of the invention that the metal can enter the matrix at or adjacent to the top and does not have to be led by long sprues to the bottom of the matrix, thereby effecting a saving in the amount of metal heretofore wasted in such sprues.

We claim herein as our invention:

1. A sand mold, having in combination a drag having the matrix and a seat for the cope formed therein, a baked sand cope supported in said seat and closing said matrix, and a baked sand core formed independent of but suspended from said cope.

2. A sand mold, having in combination a drag having a matrix and a seat for the cope formed therein, a baked sand cope supported in said seat and closing said matrix, a baked sand core, core suspending means consisting of hollow anchors provided with perforated tubular extensions embedded in the core, and adapted to extend through openings in the cope, and means for detachably securing the anchors in position.

3. A sand mold, having in combination a drag having a matrix and a seat for the cope formed therein, a cope formed of baked sand supported in said seat and closing said matrix, a central core secured to the cope and having its lower end resting on a seat formed in the drag, and an annular core detachably suspended from the cope.

4. A sand mold, having in combination a drag having a matrix and a seat for the cope formed therein, a baked sand cope supported in said seat and closing said matrix, a core formed integral with the cope and having its lower end resting in a seat formed in the closed end of the matrix, and a core detachably secured to the cope.

In testimony whereof, we have hereunto set our hands.

JAMES W. L. KERR.
CHARLES V. NEESON.

Witnesses:
ALICE A. TRILL,
THOMAS B. JOYCE.

---

Copies of this patent may be obtained for five cents each, by addressing the "Commissioner of Patents, Washington, D. C."